Patented Mar. 10, 1953

2,631,138

UNITED STATES PATENT OFFICE 2,631,138

CURING RESIN-FORMING COMPOSITIONS WITH SULFONIC ACIDS

Hans Dannenberg, Berkeley, Calif., assignor to Shell Development Company, Emeryville, Calif., a corporation of Delaware No Drawing. Application February 26, 1951, Serial No. 212,832

12 Claims. (Cl. 260—45.2)

This invention relates to a process of resinifying and curing a mixture of glycidyl polyether of a dihydric phenol and convertible urea-formaldehyde condensate with an organic sulfonic acid or sulfonyl halide, and to the resulting solid resinous product.

It has been discovered that mixtures of glycidyl polyether of a dihydric phenol and a convertible urea-formaldehyde condensate are effectively cured to solid resinous products by the action of a special class of sulfonic acids or sulfonyl halides. The cured products of the invention have a combination of excellent properties which make them ideally suited for surface-coating purposes. They are tough and flexible, adhere tenaciously to surfaces, and are resistant against the action of organic solvents, water and alkali.

Although urea-formaldehyde condensates may be cured alone with various catalysts, the cured product is not suitable as a protective coating because of undue brittleness and lack of adhesion. Similarly, when glycidyl polyethers of a dihydric phenol are cured with a polycarboxylic acid anhydride or a polyamine as proposed heretofore, the resulting cured product is also not suitable for surface coating purposes. In order to obtain a tight cure, the use of relatively large proportions of the anhydride or polyamine is necessary and the mixture must be heated or baked to effect the cure. The recommended use of approximately equivalent amounts of the anhydride or polyamine, i. e., such proportions that the mixture of polyether and curing agent contains about one carboxylic acid or amino group for each epoxy group in the ether, results in a cured product which has poor water and alkali resistance when acid anhydrides are used, and in poor stability against discoloration when polyamines are used. These faults are effectively overcome by the present invention.

In brief, the present invention is the process of resinifying a mixture of glycidyl polyether of a dihydric phenol having a 1,2-epoxy equivalency greater than 1.0, and a convertible urea-formaldehyde condensate by adding to the mixture a sulfonic acid or sulfonyl halide, which compound is a substituted hydrocarbon free of other substituent groups than 1 to 3 single members of the class consisting of sulfonic acid and sulfonyl halide groups, and permitting the resulting mixture to resinify and cure to a solid resinous product. The curing agent employed in the process of the invention contains only the sulfonic acid or sulfonyl halide group because the presence of other functional groups, such as amino, defeats the primary object of the invention, namely, the process of enabling essentially catalytic, fast, complete cure of the mixture of glycidyl polyether and urea-formaldehyde condensate.

The glycidyl polyether of a dihydric phenol employed in the mixture of resin-forming material in the process of the invention is obtainable by reacting epichlorhydrin with a dihydric phenol in alkaline medium. The polyethers are prepared by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

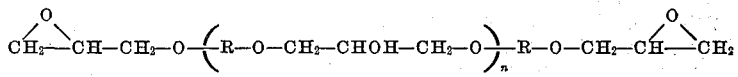

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily 0 or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The glycidyl polyethers of a dihydric phenol used in the invention have a 1,2-epoxy equivalency greater than 1.0. By the epoxy equivalency, reference is made to the average number of 1,2-epoxy groups

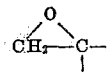

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1. The 1,2-epoxy equivalency of the polyethers is thus a value between 1.0 and 2.0.

The 1,2-epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1 N sodium hydroxide in methanol to the phenol-phthalein end point. This method is used for obtaining all epoxide values discussed herein.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)propane which is herein termed bis-phenol for convenience, 4,4'-dihydroxybenzophenone, bis(4-hydroxyphenyl)methane, 1,1 - bis(4 - hydroxyphenyl)ethane, 1,1 - bis(4-hydroxyphenyl)isobutane, 2,2-bis(4-hydroxyphenyl)butane, 2,2-bis(4-hydroxy - 2 - methylphenyl)propane, 2,2 - bis(4-hydroxy-2-tertiary-butylphenyl)propane, 2,2-bis(2 - hydroxynaphthyl)pentane, 1,5 - dihydroxynaphthalene, etc.

Preferred polyethers used in the process are prepared from 2,2-bis(4-hydroxyphenyl)propane. They contain a chain of alternating glyceryl and 2,2-bis(4-phenylene)propane radicals separated by intervening ethereal oxygen atoms, have a 1,2-epoxy equivalency between 1.0 and 2.0, and have a molecular weight of about 1200 to 4000. More generally, it is preferred to employ glycidyl polyether of a dihydric phenol which has a value for $n$ in the above-mentioned structural formula of about 6 to 15.

The glycidyl polyethers will be more fully understood from consideration of the following described preparations and the properties of the products.

*Polyether A*

Glycidyl polyethers of a dihydric phenol having lowest molecular weight, i. e., $n$ approaching or equalling zero, are best prepared by reacting the dihydric phenol and base with epichlorhydrin in the presence of a large excess of epichlorhydrin such as at least 5 mols of epichlorhydrin per mol of the phenol.

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' Mercury Method softening point of 9° C., an average molecular weight of 355 by ebullioscopic measurement in ethylene dichloride, and an epoxide value of 0.52 equivalents epoxy per 100 grams. The product is designated hereinafter as Polyether A.

*Polyether B*

Polyethers of higher molecular weight are prepared by using smaller ratios of epichlorhydrin to bis-phenol. In a vessel fitted with an agitator, 228 parts (1 mol) of bis-phenol and 75 parts (1.88 mols) sodium hydroxide as a 10% aqueous solution are introduced and heated to about 45° C. whereupon 145 parts (1.57 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 69° C. The measured molecular weight of the product is 900 and it has an epoxide value of 0.20 equivalents epoxy per 100 grams. It will be identified hereinafter as Polyether B.

*Polyether C*

This glycidyl polyether is prepared in like manner to that of Polyether B except that for each mol of bis-phenol there is employed 1.22 mols of epichlorhydrin and 1.37 mols of sodium hydroxide. The resulting polyether has a softening point of 98° C. by Durrans' Mercury Method, a molecular weight of 1400 as measured ebullioscopically in ethylene dichloride, and an epoxide value of 0.103 equivalents epoxy per 100 grams.

Polyether D

Glycidyl polyethers of still higher molecular weight are most easily prepared by heating together and reacting a lower polyether with additional dihydric phenol. 100 parts of Polyether C are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, and an epoxide value of 0.05 equivalents epoxy per 100 grams.

Polyether E

This polyether is prepared as described for Polyether D except that the 100 parts of Polyether C are mixed, heated and reacted with 7.75 parts of bis-phenol. The resulting product has a softening point of 156° C., a molecular weight of 3750, and an epoxide value of 0.036 equivalents epoxy per 100 grams.

The properties of the foregoing polyethers are summarized in the following table.

| Polyether | Softening Point, °C. | Mol. Wt. | n | Epoxy Value, eq./100 g. | 1,2-Epoxy Equivalency |
|---|---|---|---|---|---|
| A | 9 | 355 | 0.05 | 0.52 | 1.85 |
| B | 69 | 900 | 1.97 | 0.20 | 1.80 |
| C | 98 | 1,400 | 3.74 | 0.103 | 1.46 |
| D | 131 | 2,900 | 9.02 | 0.05 | 1.45 |
| E | 156 | 3,750 | 12.00 | 0.036 | 1.40 |

The convertible urea-formaldehyde condensate used in admixture with the glycidyl polyether is one obtained in known manner. It is a material which is soluble in organic solvents and capable of being converted to a form which is insoluble in such solvents. A condensate particularly suited for use in the invention is what will be termed an alkylated urea-formaldehyde condensate, by which term reference is made to urea-formaldehyde condensates containing substituent groups from alcohols. These alkylated urea-formaldehyde condensates are prepared by reacting formaldehyde with urea and an alcohol in the presence of an acid, or by first reacting urea with formaldehyde in alkaline medium so that a methylol urea is formed and then reacting this product with alcohol in an acid medium. Well suited for use in the invention are those alkylated urea-formaldehyde condensates derived from saturated aliphatic alcohols of 2 to 8 carbon atoms, and particularly suited is the butylated urea-formaldehyde condensate obtained from n-butyl alcohol. These alkylated urea-formaldehyde condensates are soluble in various organic solvents including n-butyl alcohol. Preparation of the condensates will not be reiterated here in detail since they have been repeatedly described in the prior art and the preparation is adequately disclosed in Patent Nos. 2,222,506; 2,226,518; 2,227,223; 2,322,979; 2,327,984; 2,323,357; 3,326,265; and 2,350,894.

The proportions of the two components in the mixture of the glycidyl polyether and urea-formaldehyde condensate can be varied widely. A desirable weight ratio of glycidyl polyether to urea-formaldehyde condensate is from about 90:10 to 30:70, but the invention is not limited to such a range of ratios. A more preferred range is from about 85:15 to 60:40, i. e., a mixture containing about 15 to 40% of the urea-formaldehyde condensate. Products having excellent properties are obtained with a mixture containing about 30% urea-formaldehyde condensate and about 70% glycidyl polyether.

The organic sulfonic acids or sulfonyl halides employed as catalyzing curing agents in the invention have the sulfonic acid or sulfonyl halide group or groups linked to aliphatic, aromatic, or alicyclic hydrocarbon radicals which are otherwise free of substituent groups. They include, for example, aliphatic monosulfonic acids such as methanesulfonic acid, ethanesulfonic acid, propane-1-sulfonic acid, propane-2-sulfonic acid, butane-1-sulfonic acid, 2-methylpropane-1-sulfonic acid, butane-2-sulfonic acid, hexane-1-sulfonic acid, decane-1-sulfonic acid, dodecane-1-sulfonic acid, hexadecane-1-sulfonic acid, ethanesulfonic acid, propene-2-sulfonic acid, 2-methylpropene-3-sulfonic acid, and diisobutylenesulfonic acid; the aliphatic polysulfonic acids such as methanedisulfonic acid, ethane-1,1-disulfonic acid, ethane-1,2-disulfonic acid, 2-methylpropane-1,2-disulfonic acid, methanetrisulfonic acid, and ethane-1,1,2-trisulfonic acid; the aromatic monosulfonic acids, such as benzenesulfonic acid, o-toluenesulfonic acid, m-toluenesulfonic acid, p-toluenesulfonic acid, 2,4-dimethylsulfonic acid, naphthalene-1-sulfonic acid, naphthalene-2-sulfonic acid, 2,4,5-trimethylsulfonic acid, benzylsulfonic acid, phenylethanesulfonic acid, 1-phenylethene-2-sulfonic acid, mesitylenesulfonic acid, and m-cymenesulfonic acid; the aromatic polysulfonic acids such as m-benzenedisulfonic acid, p-benzenedisulfonic acid, benzene-1,3,5-trisulfonic acid, and toluene-2,4-disulfonic acid; and the alicyclic sulfonic acids such as cyclopentanesulfonic acid and cyclohexanesulfonic acid, as well as the corresponding sulfonyl halides such as methanesulfonyl chloride, methanesulfonylbromide, ethanesulfonyl chloride, ethanesulfonyl bromide, propane-1-sulfonyl chloride, butane-1-sulfonyl chloride, 2-methylpropane-1-sulfonyl chloride, propene-2-sulfonyl chloride, methanedisulfonyl chloride, ethane-1,2-disulfonyl chloride, propane-1,2-disulfonyl chloride, benzenesulfonyl fluoride, benzenesulfonyl chloride, benzenesulfonyl bromide, benzenesulfonyl iodide, o-toluenesulfonyl chloride, p-toluenesulfonyl chloride, p-toluenesulfonyl bromide, naphthalene-2-sulfonyl chloride, benzylsulfonyl chloride, m-benzenesulfonyl chloride, cyclopentanesulfonyl chloride, and cyclohexanesulfonyl chloride.

The curing of the resin-forming mixture is effected by admixing and commingling the sulfonic acid or sulfonyl halide therewith. Curing begins immediately upon adding the catalyst to the resin-forming mixture. The sulfonic acid or sulfonyl halide catalysts in being free of other interfering functional groups induce a very rapid rate of cure such that the resin-forming mixture gels ordinarily in less than about 30 minutes. Furthermore, the curing runs to completion in comparatively short times. This rapid rate of cure occurs at ordinary atmospheric temperature such as from about 15° C. to 40° C. If desired, however, the cure can be effected at elevated temperatures in order to achieve an even more rapid rate of cure. For this purpose, a temperature of about 100° C. to 250° C. is well suited.

Owing to the rapid rate of cure with the process of the invention, it is best to use a special procedure in applications for surface coating purposes, i. e., in use of the compositions as varnishes and enamels, for example. Instead of first adding the curing catalyst to the resin-forming mixture and then applying the composition to a surface by spraying or brushing, a more feasible method is to form the composition in the spraying operation. Especially for surface-coating uses, the special procedure involves spraying a solution of the resin-forming components from an air operated spray gun which is constructed so that a solution of the sulfonic acid or sulfonyl halide separately enters and is commingled with the mixture of glycidyl polyether and urea-formaldehyde condensate in the zone of atomization. In this way, the curing catalyst is thoroughly mixed with polyether and urea condensate in the zone of atomization, and the mixture containing the catalyst is immediately impinged on the surface desired to be coated. Since spray gun coating operations invariably involve intermittent operation of the gun, there is no danger of the gun becoming clogged or plugged when constructed in the manner indicated. An excellent example of a suitable two-nozzle gun is described and illustrated in British Patent No. 566,543.

It is preferred to employ such a proportion of curing catalyst that the compositions contain about 0.1 to 5% of the sulfonic acid or sulfonyl halide based upon the combined weight of the glycidyl polyether and the urea-formaldehyde condensate. When about 0.1 to 5% of sulfonic acid or corresponding halide is employed, the resulting cured resinous product is hard and tough, and has outstanding resistance against the deteriorating and destructive action of alkalies. The cured resinous products of the invention are thus of great value as surface coating films for protection of metal surfaces which come into repeated contact with alkaline materials such as soapy water, as is the case with washing machines. If more than about 5% of curing catalyst is used, the alkali resistance of the cured product decreases very rapidly. The use of the sulfonic acid or halide in amounts of about 0.1 to 5% with proper time and temperature for completion of cure gives a resinous product having a very tight cure and insolubility in all non-destructive organic solvents such as methyl ethyl ketone, for example. A more preferred range of catalyst concentration is from about 0.5 to 3%.

Although not essential, it is generally preferred to effect the mixing of the curing catalyst with the glycidyl polyether and the urea condensate dissolved in a solvent. The glycidyl polyethers of a dihydric phenol as well as the urea condensates are soluble in a variety of solvents including ketones, such as acetone, methyl ethyl ketone, methyl isobutyl ketone, isophorone, etc.; esters, such as ethyl acetate, butyl acetate, Cellosolve acetate (ethylene glycol monoacetate), etc.; ether alcohols, such as methyl, ethyl or butyl ether of ethylene glycol or diethylene glycol; and chlorinated solvents, such as trichloropropane, chloroform, etc. To save expense, these active solvents are ordinarily used in admixture with diluents which are themselves not solvents when used alone, but which may be incorporated with active solvents. Reference is made to aromatic hydrocarbons, such as benzene, toluene, xylene, aromatic petroleum thinner, etc.; and alcohols such as ethyl, isopropyl and n-butyl alcohol. In order to achieve desired evaporation and drying characteristics, the solvents are combined and balanced for desired properties in the manner well known in the lacquer and varnish arts. Typical solvent combinations are illustrated in examples given hereinafter. It is also often convenient to add the curing catalyst as a solution in an organic solvent such as esters like ethyl acetate, n-butyl acetate, or Cellosolve acetate; alcohols such as ethanol and n-butanol; or ketones such as acetone or methyl ethyl ketone, as well as mixtures of two or more of such liquid compounds.

When used as film-forming materials, the compositions containing the glycidyl polyether, the urea condensate and curing catalyst may contain various other materials such as pigments, plasticizers, and other resins. Pigments such as titanium dioxide, antimony oxide, lead oxide, carbon black, chrome yellow, zinc oxide, para red, and the like, are used in the compositions. Best results in preparing enamels are obtained by grinding the pigment with a portion of the solvent and urea condensate and then adding the remainder of the solvent and glycidyl polyether after the grinding operation. The enamel is ready for application after addition of the curing catalyst.

With either varnishes or enamels of the invention, thick layers of the film-forming material may be applied to a surface such as metal, wood, or the like. Curing completely therethrough is attained because the conversion to an insoluble film is not dependent upon contact with air. This fact also makes the compositions valuable in manufacture of laminates wherein the laminae are cloth, paper, glass-cloth, and the like. Such laminae are impregnated with a solution of the glycidyl polyether and curing catalyst. After drying, the impregnated sheets are stacked and cure is effected in a heated press.

Many of the compositions are also suitable for molding operations wherein they are introduced into a mold, compressed and cure completed with heat. Various fillers, dyes and pigments may be incorporated with the compositions in use for molding operations such as wood flour, talc, alpha-cellulose, zinc sulfide, etc.

The invention is illustrated in the following examples, but not limited thereby. The parts are by weight.

EXAMPLE I

Some general indications on the rate of cure of the catalysts of the invention were obtained by adding a variety of them to solutions containing glycidyl polyethers of a dihydric phenol and a butylated urea-formaldehyde condensate, and observing the times of gelation of the mixtures.

A stock solution was prepared containing 85 parts of Polyether E and 15 parts of butylated urea-formaldehyde resin (Beetle 227-8), obtained by condensing urea with formaldehyde in the presence of n-butyl alcohol in customary fashion, dissolved in 68.6 parts of methyl isobutyl ketone, 36.25 parts of xylene, 38.1 parts of Cellosolve acetate (ethylene glycol monoacetate), and 9.05 parts of n-butanol. The catalysts named in the following table in 10% solution of n-butyl acetate were added to stirred portions of the stock solution so that there was present 1 part of catalyst per 100 parts of resin solids. Gelation was easily recognizable and the time thereof was noted. The results are tabulated below.

| Catalyst | Gel Time, min. |
|---|---|
| Mixed C₁-C₄ alkanesulfonic acids | 3½ |
| m-Benzenedisulfonic acid | 4½ |
| p-Toluenesulfonic acid | 7 |
| Methanedisulfonyl chloride | 10 |
| Methanedisulfonic acid | 22 |

EXAMPLE II

The rapid rate of gelation of mixtures of the glycidyl polyethers and alkylated urea-formaldehyde resins caused by the sulfonic acids or halides makes it most feasible to apply the compositions for surface-coating purposes in a particular manner. This is done with a special spray gun constructed substantially as described and shown in British Patent No. 566,548, whereby the mixture of polyether and urea resin is commingled with the curing agent in the zone of atomization after solutions of each of the two have left separate nozzles of the gun. Variations in the proportions of curing agent with the polyether-urea resin mixture is achieved by using solutions of different concentrations of curing agent as feed for the gun.

In order to test the curing characteristics and related matters of a number of sulfonic acids and halides (see table below), bonderized sheet steel panels were coated with compositions using the above-noted special spray gun. A stock solution was prepared containing 85 parts Polyether E and 15 parts butylated urea-formaldehyde resin (Beetle 227-8), obtained by condensing urea with formaldehyde in the presence of n-butyl alcohol in customary fashion, dissolved in 67.4 parts methyl isobutyl ketone, 44.9 parts toluene, 37.7 parts Cellosolve acetate (ethylene glycol monoacetate), 9.0 parts n-butanol and 6.0 parts xylene. Solutions containing about 10 to 20% of the curing agents were prepared in n-butyl acetate as solvent. Films on the metal panels were obtained by spraying. They were allowed to dry and cure at 77° F. under 50% humidity.

The extent of cure was determined by resistance of the film to solution or change when contacted with methyl ethyl ketone at the times indicated in the table below. The test was conducted by placing a drop of methyl ethyl ketone on the film and allowing the ketone to soak in for 2 minutes. The treated spot was then tested to determine whether it was scratched under gentle pressure of a sharpened pencil point. Variations from unchanged to completely soluble are easily ascertained in this manner. The ratings of the films are given in the table according to designations of 1 (worst) to 10 (best) wherein 1 is soluble, 4 is partly soluble, 7 is softened, and 10 is unchanged and insoluble. A complete tight cure has a value of 10.

Tests for water resistance were conducted by immersing films in distilled water for 24 hours at room temperature after which their appearance was noted while wet and again on recovery after drying for another 24 hours. The table lists ratings on a scale of 1 to 10 wherein 1 means white and opaque, 4 means white and translucent, 7 means hazy and 10 means clear and unchanged.

The alkali resistance was tested by placing two drops of 15% aqueous sodium hydroxide solution on the films under a cover glass to prevent evaporation and noting the condition after 48 hours. The table lists ratings on a scale of 1 to 10 wherein 1 means deteriorated, 4 means discolored or milky, 7 means lifted, and 10 means unchanged.

| Curing Agent | Percent | Solvent Resistance | | | Water Resistance | | Alkali Resistance |
|---|---|---|---|---|---|---|---|
| | | 2 hrs. | 24 hrs. | 7 days | 24 hrs. | Rec. | |
| m-Benzenedisulfonic acid | 1.88 | 9 | 10 | 10 | 1 | 1 | 10 |
| C₁-C₄ alkanesulfonic acid | 1.12 | 10 | 10 | 10 | 9 | 10 | 10 |
| Methanedisulfonic acid | 0.95 | 8 | 9 | 9 | 2 | 9 | 10 |
| Methanedisulfonyl chloride | 2.3 | 9 | 10 | 10 | 5 | 9 | 10 |
| p-Toluenesulfonic acid | 0.84 | 9 | 9 | 10 | 2 | 10 | 10 |

EXAMPLE III

A solution was prepared containing 70 parts of Polyether E and 30 parts of the above-mentioned butylated urea-formaldehyde resin (Beetle 227-8) dissolved in 42 parts Cellosolve acetate (ethylene glycol monoacetate), 75 parts methyl isobutyl ketone, 50 parts toluene, 18 parts n-butyl alcohol and 12 parts xylene. Using m-benzenedisulfonic acid dissolved in n-butyl acetate as curing agent, the solution was sprayed on sheet steel panels with the special spray gun described in Example II. The resulting films were subjected to the tests noted in that example with the following results wherein the scale values are as described above.

| Percent Curing Agent, Solids Basis | Solvent Resistance | | | Water Resistance | | Alkali Resistance |
|---|---|---|---|---|---|---|
| | 2 hrs. | 24 hrs. | 7 days | 24 hrs. | Rec. | |
| 0.70 | 10 | 10 | 10 | 5 | 9 | 10 |
| 2.17 | 10 | 10 | 10 | 2 | 4 | 10 |

EXAMPLE IV

An enamel base was prepared containing 40 parts of Polyether D, 10.1 parts of butylated urea-formaldehyde resin (Beetle 227-8) and 40.5 parts of titanium dioxide pigment dissolved and dispersed in 53 parts of methyl isobutyl ketone, 48 parts of Cellosolve acetate, 6.1 parts of alcohols (ethyl and n-butyl), 49.6 parts of xylene and 9.7 parts of aromatic thinner. Films were prepared by spraying the enamel base along with n-butyl acetate solutions of the curing agents noted in the following table, onto sheet metal panels with the aid of the special spray gun described in Example II. The percentage of curing agent listed in the table is based upon the weight of resin-forming solids (the polyether plus the urea resin). The results of the tests given in the table are summarized as rating values as described in Example II.

| Curing Agent | Percent | Solvent Resistance After— | | | Alkali Resistance |
|---|---|---|---|---|---|
| | | 2 hrs. | 24 hrs. | 7 days | |
| Methanedisulfonic acid | 1.5 | 8 | 8 | 8 | 8 |
| Methanedisulfonyl chloride | 2.1 | 9 | 9 | 9 | 8 |

EXAMPLE V

An enamel base was prepared containing 400 parts of Polyether E, 200 parts of butylated urea-formaldehyde resin, 409 parts of titanium dioxide pigment, 200 parts of Cellosolve acetate (ethylene glycol monoacetate) and 200 parts of xylene. About 6.8 parts of p-toluenesulfonic acid were added and stirred into the enamel base. Sheet steel panels were then coated with the enamel and cured films were obtained by baking for one-half hour in an air oven at the temperatures noted in the following table. For comparative purposes, another group of baked panels was prepared using the enamel base containing no curing agent. The extent of cure of the resulting films was determined by observing the extent of solubility of the film when contacted with a drop of methyl ethyl ketone. The table lists results with use of scale values as described in Example II.

| Catalyzed Temperature, °C. | Yes | No |
|---|---|---|
| 120 | 8 | 1 |
| 150 | 9 | 2 |
| 180 | 9 | 3 |

EXAMPLE VI

About 4.1 parts of naphthalenesulfonic acid were added and stirred into another batch of the enamel base described in Example V. A sheet steel panel was coated with the resulting enamel and baked at 150° C. for one-half hour in an air oven. Upon testing the resulting film by the methyl ethyl ketone solubility test, it was found that it had a cure value of 9.

EXAMPLE VII

A stock solution was prepared containing 800 parts of Polyether D and 200 parts of butylated urea-formaldehyde resin (Beetle 227-8) dissolved in 778 parts of xylene, 698 parts of Cellosolve acetate (ethylene glycol monoacetate), and 120 parts of n-butyl alcohol. The curing agent, p-toluenesulfonic acid, was added to portions of the stock solution as a 20% solution in n-butyl acetate in amounts of 0.5, 1.0 and 2.0% by weight based upon the resin-forming solids (polyether plus urea resin). Cold rolled 24 gauge steel panels were coated with the film-forming compositions immediately after preparation with use of a Fischer-Payne dip-coater operating at a speed of 2 inches per minute. The dipped panels were allowed to dry for at least one-half hour at room temperature (about 25° C.) and then baked in an air oven at 300° F., 350° F., or 400° F. The resulting films were subjected to the degree of cure test with methyl ethyl ketone described in Example II and it was found that all were completely cured in having a test rating of 10. By contrast, similarly prepared films of the stock solution alone containing no curing agent had cure ratings at the following baking temperatures of 3 at 300° F., 8 at 350° F. and 9 at 400° F. Panels having baked films thereon of the stock solutions containing the above-noted percentages of p-toluenesulfonic acid were also subjected to a water-resistance test. The test was conducted by immersing a coated panel in boiling water for 30 minutes. It was then observed whether there was any change (whitening) in appearance of the film or loss of adhesion. In all cases the films passed the test.

EXAMPLE VIII

Another stock solution was prepared containing 700 parts of Polyether D and 300 parts of butylated urea-formaldehyde resin (Beetle 227-8) dissolved in 803 parts of xylene, 683 parts of Cellosolve acetate (ethylene glycol monoacetate), and 180 parts of n-butyl alcohol. A 20% solution of p-toluenesulfonic acid in n-butyl acetate was added to portions of the stock solution in amounts such that there was present 0.5, 1.0 or 2.0% of acid based upon the resin-forming material. Cold rolled 24 gauge steel panels were coated and baked as described in Example VII. Excellent baked films were obtained which had top rating values when subjected to the methyl ethyl ketone solubility test and water resistance test described in Example VII.

EXAMPLE IX

The unique character of the catalyzation induced by the sulfonic acids were determined by adding p-toluenesulfonic acid to solutions containing a glycidyl polyether alone, a urea-formaldehyde condensate alone, or a combination of the two resin-forming substances, and observing the time of gelatin.

A solution was prepared of 100 parts of Polyether E dissolved in 122 parts of methyl isobutyl ketone, 81 parts of toluene and 66.5 parts of Cellosolve acetate. Another solution was prepared containing 85 parts of Polyether E and 15 parts of butylated urea-formaldehyde condensate (Beetle 227-8) dissolved in 112.5 parts of methyl isobutyl ketone, 75.2 parts of toluene, 62.6 parts of Cellosolve acetate, 5.9 parts of xylene and 8.8 parts of n-butyl alcohol. The third solution contained 100 parts of butylated urea-formaldehyde condensate dissolved in 60 parts of n-butyl alcohol and 107 parts of xylene. While stirring at room temperature, 2 parts of p-toluenesulfonic acid were added to each solution. The time of gelation was noted and is given in the following table wherein the symbol U-F is used to designate the butylated urea-formaldehyde condensate.

| Resin-forming Substance | Gel Time |
|---|---|
| 100% Polyether E | No gelation in 24 hrs. |
| 85% Polyether E and 15% U-F | Gelled in 7 min. |
| 100% U-F | No gelation in 24 hrs. |

I claim as my invention:

1. A process of preparing resinous products which comprises curing a mixture of glycidyl polyether of a dihydric phenol having a 1,2-epoxy equivalency greater than 1.0 and a convertible alkylated urea-formaldehyde condensate in the presence of a substituted hydrocarbon containing as the sole substituent group from 1 to 3 single members of the class consisting of sulfonic acid and sulfonyl halide groups.

2. The solid resinous product obtained according to the process defined in claim 1.

3. A process of preparing resinous products which comprises curing a mixture of glycidyl polyether of dihydric phenol having a 1,2-epoxy equivalency greater than 1.0 and a convertible alkylated urea-formaldehyde condensate soluble in n-butyl alcohol, the curing being effected with the mixture in the presence of a substituted hydrocarbon containing as the sole substituent group from 1 to 3 single members of the class consisting of sulfonic acid and sulfonyl halide groups, and the mixture having a weight ratio of said polyether to said condensate of from about 90:10 to 30:70.

4. The solid resinous product obtained according to the process defined in claim 3.

5. A process of producing resinous products which comprises curing a mixture of glycidyl polyether of a dihydric phenol having a 1,2-epoxy equivalency greater than 1.0 and a convertible alkylated urea-formaldehyde condensate containing about 15 to 40% by weight of the latter in the presence of an added 0.1 to 5% by weight of a substituted hydrocarbon containing as the sole substituent group from 1 to 3 single members of the class consisting of sulfonic acid and sulfonyl halide groups.

6. The solid resinous product obtained according to the process defined in claim 5.

7. A process of preparing resinous products which comprises curing a mixture of glycidyl polyether of a 2,2-bis(4-hydroxyphenyl)propane having a 1,2-epoxy equivalency greater than 1.0 and a convertible butylated urea-formaldehyde condensate in the presence of a substituted hydrocarbon containing as the sole substituent group from 1 to 3 single members of the class consisting of sulfonic acid and sulfonyl halide groups.

8. The solid resinous product obtained according to the process defined in claim 7.

9. A process of producing a resinous product which comprises curing a mixture of a butylated urea-formaldehyde condensate soluble in n-butyl alcohol and glycidyl polyether of 2,2-bis(4-hydroxyphenyl)propane having a 1,2-epoxy equivalency greater than 1.0 and a molecular weight of about 1200 to 4000, in the presence of about an added and commingled 0.5 to 3% by weight of p-toluenesulfonic acid based upon the combined weights of said condensate and said polyether, said mixture containing a weight ratio of said polyether to said condensate of about 85:15 to 60:40.

10. The solid resinous product obtained according to the process defined in claim 9.

11. A process of producing a resinous product which comprises curing a mixture of a butylated urea-formaldehyde condensate soluble in n-butyl alcohol and glycidyl polyether of 2,2-bis(4-hydroxyphenyl)propane having a 1,2-epoxy equivalency greater than 1.0 and a molecular weight of about 1200 to 4000, in the presence of about an added and commingled 0.5 to 3% by weight of m-benzenedisulfonic acid based upon the combined weights of said condensate and said polyether, said mixture containing a weight ratio of said polyether to said condensate of about 85:15 to 60:40.

12. A process of producing a resinous product which comprises curing a mixture of a butylated urea-formaldehyde condensate soluble in n-butyl alcohol and glycidyl polyether of 2,2-bis(4-hydroxyphenyl)propane having a 1,2-epoxy equivalency greater than 1.0 and a molecular weight of about 1200 to 4000, said curing being effected with the mixture in the presence of about an added and commingled 0.5 to 3% by weight of alkanesulfonic acid based upon the combined weights of said condensate and said polyether, said mixture containing a weight ratio of said polyether to said condensate of from about 85:15 to 60:40, and said alkanesulfonic acid containing 1 to 4 carbon atoms in the alkane groups thereof.

HANS DANNENBERG.

REFERENCES CITED

The following references are of record in the file of this patent:

UNITED STATES PATENTS

| Number | Name | Date |
|---|---|---|
| 2,258,546 | Dietz | Oct. 7, 1941 |

FOREIGN PATENTS

| Number | Country | Date |
|---|---|---|
| 566,543 | Great Britain | Jan. 3, 1945 |
| 583,471 | Great Britain | Dec. 19, 1946 |

OTHER REFERENCES

Shell Paint, Oil and Chemical Review, November 9, 1950, vol. 113, No. 23, pages 15-18, 48, 49.